United States Patent
Li et al.

(10) Patent No.: US 10,706,501 B2
(45) Date of Patent: Jul. 7, 2020

(54) METHOD AND APPARATUS FOR STRETCHING IMAGE

(71) Applicant: BOE TECHNOLOGY GROUP CO., LTD., Beijing (CN)

(72) Inventors: Xiaoyu Li, Beijing (CN); Pablo Navarrete Michelini, Beijing (CL); Ran Duan, Beijing (CN); Lihua Geng, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 15/908,966

(22) Filed: Mar. 1, 2018

(65) Prior Publication Data
US 2019/0005614 A1 Jan. 3, 2019

(30) Foreign Application Priority Data
Jun. 30, 2017 (CN) .......................... 2017 1 0524990

(51) Int. Cl.
*G06T 3/40* (2006.01)
*G06T 7/11* (2017.01)

(52) U.S. Cl.
CPC .............. *G06T 3/40* (2013.01); *G06T 3/4061* (2013.01)

(58) Field of Classification Search
None
See application file for complete search history.

(56) References Cited

U.S. PATENT DOCUMENTS

2006/0028735 A1* 2/2006 Liu .................... G06K 9/00228
359/687

FOREIGN PATENT DOCUMENTS

| CN | 101346982 A | 1/2009 |
| CN | 101346982 A2 | 1/2009 |
| CN | 105957016 A | 9/2016 |

* cited by examiner

*Primary Examiner* — Matthew C Bella
*Assistant Examiner* — Brian D Shin
(74) *Attorney, Agent, or Firm* — Calfee, Halter & Griswold LLP

(57) ABSTRACT

The present disclosure provides a method and an apparatus for stretching an image. The method for stretching an image includes: selecting a corresponding stretching mode according to a mode selection parameter; generating a corresponding stretching filter group according to a stretching parameter and the selected stretching mode, and segmenting input image data into blocks; and processing the input image data segmented into blocks by the stretching filter group, to obtain stretched image data.

18 Claims, 4 Drawing Sheets

--- selecting a corresponding stretching mode according to a mode selection parameter — S110 generating a corresponding stretching filter group according to a stretching parameter and the selected stretching mode, and segmenting input image data into blocks — S120 processing the input image data segmented into blocks by the stretching filter group, to obtain stretched image data — S130

METHOD AND APPARATUS FOR STRETCHING IMAGE

CROSS REFERENCE

The present application claims the priority of Chinese Patent Application No. 201710524990.2, filed on Jun. 30, 2017, and the entire contents thereof are incorporated herein by reference as part of the present application.

TECHNICAL FIELD

The present disclosure relates to the technical field of image signal processing, and in particular to a method and an apparatus for stretching an image.

BACKGROUND

In order to meet display requirements of some special occasions, such as in vehicle-mounted navigators, handheld electronic display devices, some display modules with special resolution (herein referring to hardware resolution) need to be produced on production lines. During the production process of these display modules with special resolution, point-screen detection needs to be performed to test the display performance of these display modules. Since the special resolutions may be formed by stretching the normal resolution (herein refereeing to image resolution), and the display modules with special resolution are generally formed by improving or splicing the display modules with normal resolution on production lines, the display modules with special resolution generally have the same display characteristics as the display modules with normal resolution. In order to detect the display performance of these display modules with special resolution on the production line of the display module, the display module with special resolution is required to display a detection picture the same as that on the display module with normal resolution, for comparing detection.

It should be noted that, information disclosed in the above background portion is provided only for better understanding of the background of the present disclosure, and thus it may contain information that does not constitute the prior art known by those ordinary skilled in the art.

SUMMARY

Other features and advantages of the present disclosure will be apparent from the following detailed description, or may be partly learned by practice of the present disclosure.

According to an aspect of the present disclosure, there is provided a method for stretching an image, including: selecting a corresponding stretching mode according to a mode selection parameter; generating a corresponding stretching filter group according to a stretching parameter and the selected stretching mode, and segmenting input image data into blocks; and processing the input image data segmented into blocks by the stretching filter group, to obtain stretched image data.

In an exemplary embodiment of the present disclosure, the mode selection parameter includes a first parameter and a second parameter, and the selecting a corresponding stretching mode according to a mode selection parameter includes: selecting a column stretching mode when the first parameter is a first value and the second parameter is a second value; selecting a row stretching mode when the first parameter is the second value and the second parameter is the first value; and selecting a row and column stretching mode when both the first parameter and the second parameter are the first values.

In an exemplary embodiment of the present disclosure, the stretching parameter includes a column stretching parameter, the generating a corresponding stretching filter group according to a stretching parameter and the selected stretching mode, and segmenting input image data into blocks includes: when the column stretching mode is selected, generating a corresponding column stretching filter group according to the column stretching parameter, the column stretching filter group including P filters, each filter including k elements; and segmenting the input image data into longitudinal wid/P blocks, wherein the wid is a column number of the input image data.

In an exemplary embodiment of the present disclosure, the P is obtained according to a following formula: (wid+Cof_a)/wid=M/P, wherein (wid+Cof_a) is a column number of data output after being column stretching processed, and M/P is a simplest ratio.

In an exemplary embodiment of the present disclosure, the P is a positive integer greater than 1, and the k is smaller than the column number wid of the input image data.

In an exemplary embodiment of the present disclosure, the method further includes: caching the k input image data.

In an exemplary embodiment of the present disclosure, the stretching parameter includes a row stretching parameter, and the generating a corresponding stretching filter group according to a stretching parameter and the selected stretching mode, and segmenting input image data into blocks includes: when the row stretching mode is selected, generating a corresponding row stretching filter group according to the row stretching parameter, the row stretching filter group including Q filters, each filter including h elements; and segmenting the input image data into horizontal high/Q blocks, wherein the high is a row number of the input image data.

In an exemplary embodiment of the present disclosure, the Q is obtained according to a following formula: (high+Cof_b)/high=N/Q, wherein (high+Cof_b) is a row number of data output after being row stretching processed, and N/Q is a simplest ratio.

In an exemplary embodiment of the present disclosure, the Q is a positive integer greater than 1, and the h is smaller than the row number high of the input image data.

In an exemplary embodiment of the present disclosure, the method further includes: caching the input image data of h rows.

In an exemplary embodiment of the present disclosure, the processing the input image data segmented into blocks by the stretching filter group, to obtain stretched image data includes: when the row and column stretching mode is selected, performing column stretching processing on the input image data; and performing row stretching processing on the data obtained through the column stretching processing.

In an exemplary embodiment of the present disclosure, a resolution of the input image data is wid multiplied by high, a resolution of the stretched image data is (wid+Cof_a) multiplied by (high+Cof_b), wherein Cof_a is less than wid and Cof_b is less than high.

According to an aspect of the present disclosure, there is provided an apparatus for stretching an image, including: a stretching mode selecting module, configured to select a corresponding stretching mode according to a mode selection parameter; a stretching filter group generating and image segmenting module, configured to generate a corresponding stretching filter group according to a stretching parameter and the selected stretching mode, and segment input image data into blocks; and a stretching processing module, configured to process the input image data segmented into blocks by the stretching filter group, to obtain stretched image data.

In an exemplary embodiment of the present disclosure, the stretching mode includes one or more of a column stretching mode, a row stretching mode and a row and column stretching mode.

In an exemplary embodiment of the present disclosure, the stretching filter group generating and image segmenting module includes a column stretching filter group generating and image column segmenting sub-module.

In an exemplary embodiment of the present disclosure, the stretching filter group generating and image segmenting module includes a row stretching filter group generating and image row segmenting sub-module.

In an exemplary embodiment of the present disclosure, the stretching processing module includes a column stretching processing sub-module and a row stretching processing sub-module.

According to an aspect of the present disclosure, there is provided an apparatus for stretching an image, including: a processor; and a memory, having computer readable codes stored thereon that, when executed, causes the processor to perform the method for stretching an image according to the above aspect of the present disclosure.

It is to be understood that both the foregoing general description and the following detailed description are exemplary and explanatory only and are not restrictive of the present disclosure, as claimed.

This section provides a summary of various implementations or examples of the technology described in the present disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. Apparently, the accompanying drawings in the following description show merely some embodiments of the present disclosure, and those skilled in the art may still derive other drawings from these accompanying drawings without creative labor.

DETAILED DESCRIPTION

Example embodiments will now be described more fully with reference to the accompanying drawings. However, the example embodiments may be embodied in many forms and should not be construed as limited to the embodiments set forth herein; rather, the features, structures, or characteristics described herein may be combined in any suitable manner in one or more embodiments. In the following description, numerous specific details are given to provide a thorough understanding of embodiments of the present disclosure. However, those skilled in the art will recognize that the technical solutions of the present disclosure may be practiced without one or more of the specific details, or may adopt other methods, components, apparatuses, steps and the like.

Figure 1:
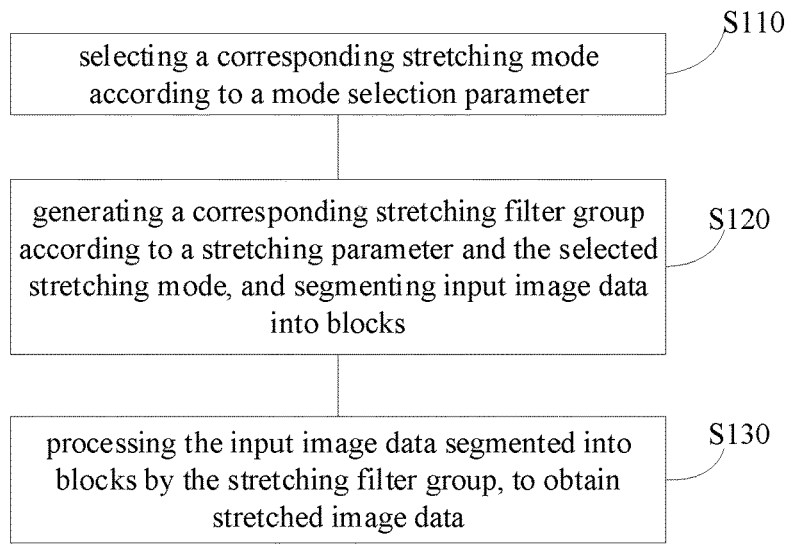
FIG. 1 shows a schematic diagram of a method for stretching an image in an exemplary embodiment of the present disclosure.

FIG. 1 shows a schematic diagram of a method for stretching an image in an exemplary embodiment of the present disclosure.

As shown in FIG. 1, the method for stretching an image may include following steps.

In step S110, a corresponding stretching mode is selected according to a mode selection parameter.

In an exemplary embodiment, the mode selection parameter includes a first parameter and a second parameter, and the selecting a corresponding stretching mode according to a mode selection parameter may include: selecting a column stretching mode when the first parameter is a first value (for example, 1) and the second parameter is a second value (for example, 0); selecting a row stretching mode when the first parameter is the second value and the second parameter is the first value; and selecting a row and column stretching mode when both the first parameter and the second parameter are the first values.

It should be noted that, the first value and the second value are not limited to the above 1 and 0. In other embodiments, values of the first value and the second value may also be exchanged. For example, the first value is 0 and the second value is 1. In addition, any other suitable method for selecting the stretching mode is within the protection scope of the present disclosure.

In the embodiment of the present disclosure, it is assumed that the first parameter is Sel1 and the second parameter is Sel2. Firstly, the stretching mode is selected according to Sel1 and Sel2. For example, a currently selected stretching mode may be determined based on the values of Sel1 and Sel2 in the following table:

| Sel1 | Sel2 | stretching mode |
|------|------|-----------------|
| 1    | 0    | column stretching mode |
| 0    | 1    | row stretching mode |
| 1    | 1    | row and column stretching mode |

Figure 2:
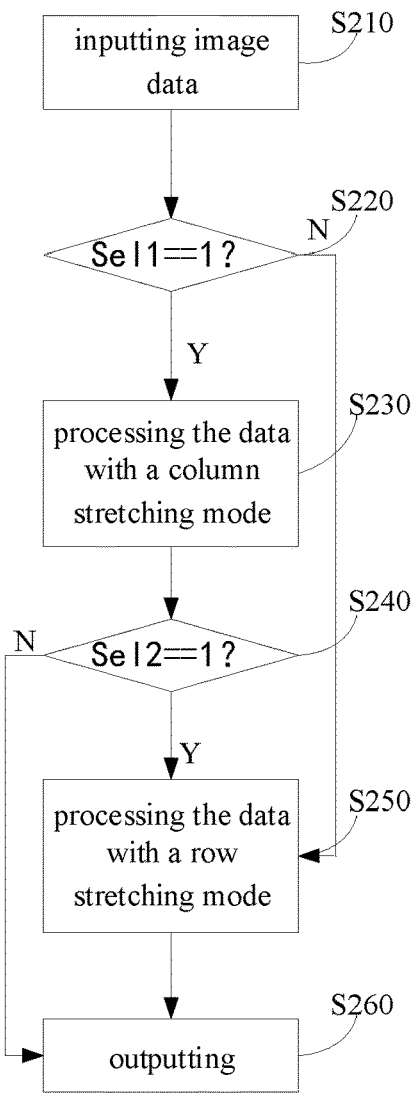
FIG. 2 shows a flowchart of stretching mode selection in an exemplary embodiment of the present disclosure.

The flowchart of the stretching mode selection is shown in FIG. 2. The stretching mode selection may include following steps.

In step S210, image data is input.

In an exemplary embodiment, it may be assumed that the resolution of the input image data is wid×high, and the resolution of the stretched image data after the image stretching processing is (wid+Cof_a)×(high+Cof_b). In the embodiment, a multiple of the column stretching is (wid+Cof_a)/wid=M/P, and a multiple of the row stretching is (high+Cof_b)/high=N/Q.

In an exemplary implementation, Cof_a is smaller than wid and Cof_b is smaller than high. In some embodiments, Cof_a is much smaller than wid and Cof_b is much smaller than high. For example, a resolution of the input image is 1920×1080 and a resolution of the image required to be output is (1920+8)×(1080+8). In this way, the method of the embodiment of the present disclosure is most effective for optimization, and the number of inserted rows and columns is relatively small. The systems of the standard image stretching algorithm implemented by hardware disclosed in the prior art does not consider the resource problem of the hardware. The embodiments of the present disclosure are mainly directed to the implementation of hardware for image stretching of the non-standard image stretching multiple, to save a great deal of hardware resource. Especially for the case that the number of rows and columns increased after stretching is much smaller than the number of rows and columns of the original input image, the optimization effect may reach more than 90%. However, the image stretching of an integral multiple, and the image stretching where Cof_a is not less than the wid and Cof_b is not less than the high, may also be applicable to the method of the embodiment of the present disclosure.

In step S220, it is judged whether Sel1 is equal to 1. When Sel1 is equal to 1, the process proceeds to step S230; otherwise, when Sel1 is not equal to 1, the process jumps to step S250.

In step S230, the data is processed with a column stretching mode.

The specific data processing method with the column stretching mode may refer to following embodiments.

In step S240, it is judged whether Sel2 is equal to 1. When Sel2 is equal to 1, the process proceeds to step S250; otherwise, when Sel2 is not equal to 1, the process jumps to step S260.

In step S250, the data is processed with a row stretching mode.

The specific data processing method with the row stretching mode may refer to following embodiments.

In step S260, the stretched image data is output.

In the embodiment of the present disclosure, when Sel1 is 1, the input image data is transmitted to the column stretching module for data processing, otherwise, the data is transmitted to the row stretching module for data processing. When Sel2 is 1, the data processed by the column stretching module is transmitted to the row stretching module for data processing, otherwise, the data is transmitted to the output module of the system.

In step S120, a corresponding stretching filter group is generated according to a stretching parameter and the selected stretching mode, and input image data is segmented into blocks.

In step S130, the input image data segmented into blocks is processed by the stretching filter group, to obtain stretched image data.

In an exemplary embodiment, the stretching parameter includes a column stretching parameter, the generating a corresponding stretching filter group according to a stretching parameter and the selected stretching mode, and segmenting input image data into blocks may include: when the column stretching mode is selected, generating a corresponding column stretching filter group according to the column stretching parameter, the column stretching filter group including P filters, each filter including k elements; and segmenting the input image data into longitudinal wid/P blocks, wherein the wid is a column number of the input image data.

In an exemplary embodiment, the P may be obtained according to a following formula: (wid+Cof_a)/wid=M/P.

In an exemplary embodiment, (wid+Cof_a) is a column number of data output after being column stretching processed, and M/P is a simplest ratio, i.e., there is no common divisor between M and P.

In an exemplary embodiment, the P is a positive integer greater than 1, and the k is smaller than the column number wid of the input image data. In order to save hardware resource and save cost, the embodiments of the present disclosure propose a method that a column stretching filter vector group (or a column stretching filter group) contains a relatively small number of elements, i.e., k is relatively small, for achieving image column stretching.

In an exemplary embodiment, the method further includes: caching the k input image data.

The column stretching algorithm disclosed in this embodiment of the present disclosure adopts a filter vector group F[M] when being implemented. The column stretched filter vector F[M] contains P filters, each filter containing k elements (k is a number much less than num2).

When the stretching is performed by using an existing standard image stretching algorithm, it is assumed that the filter vectors of data processed by the row stretching and column stretching are respectively F2 and F1, and the number of elements contained in F2 and F1 is respectively num1 and num2, and num1 and num2 are numbers much larger than 1. When this standard image stretching algorithm is transplanted to the hardware, column stretching and row stretching respectively need to cache the image data of num1 rows and num2 columns. Since the num1 and num2 are usually large, it consumes a mass of hardware resource.

Figure 3:
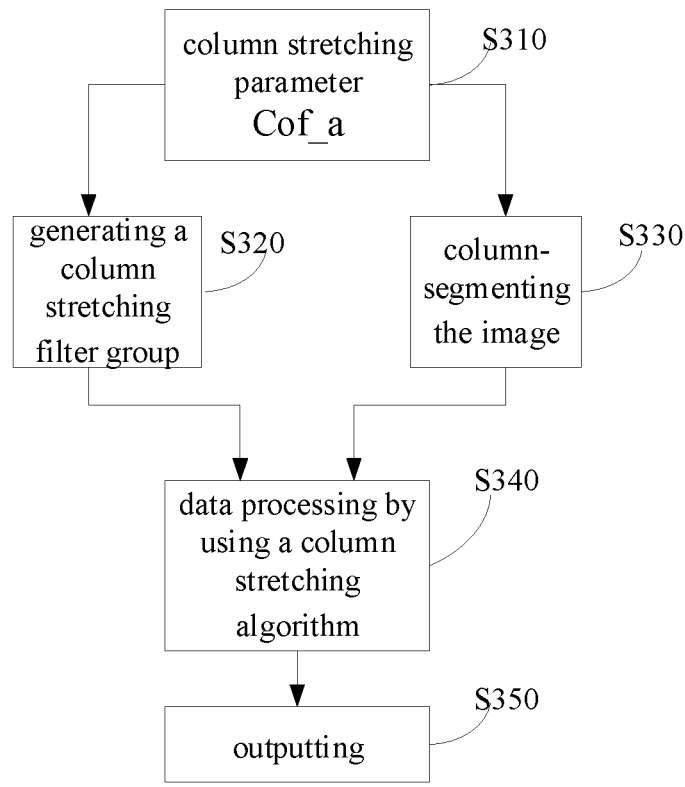
FIG. 3 shows a flowchart of column stretching mode processing in an exemplary embodiment of the present disclosure.

The data processing flow of the column stretching mode according to the embodiment of the present disclosure is shown in FIG. 3. As shown in FIG. 3, the column stretching data processing may include following steps.

In step S310, a column stretching parameter Cof_a is input.

In step S320, a column stretching filter group is generated based on the column stretching parameter Cof_a.

In step S330, the input image is column-segmented.

In step S340, the column-segmented input image is subjected to data processing by using a column stretching algorithm.

In step S350, the column-stretched image data is output.

In the embodiment of the present disclosure, in the column stretching mode, the system generates a corresponding column stretching filter group F[P] according to the column stretching parameter Cof_a, each filter containing k elements, and segments the image into longitudinal wid/P=(wid+cof_a)/M blocks and determines a boundary of each block.

In the embodiment, M and P may be calculated by the formula 1-1:

$$\frac{wid + \text{Cof\_a}}{wid} = \frac{M}{P} \qquad (1\text{-}1)$$

wherein wid is the number of columns of the input image, Cof_a is the column stretching parameter, M/P is the simplest ratio with no common divisor therebetween. Then the result is transmitted to the column stretching algorithm module for processing. When each block is processed, the pixel value output when the number of columns j is less than P−1 is given by the formula 1-2:

$$P_{i,j} = \{\Sigma_{j=1}^{j+1}(F_m[j] \cdot f[p][j])\}/2^{10} (0 \leq m \leq 239, 0 \leq j \leq 239) \qquad (1\text{-}2)$$

The pixel value output when j is equal to P−1 is given by the formula 1-3:

$$P_{i,j+1}=f[i][j](j=239) \qquad (1\text{-}3)$$

The $P_{i,j}$ in the above formula is the output pixel value. Fm[j] indicates that the number of filter vectors is m and the number of filter elements is j. The f [i][j] is the input image pixel. When the algorithm is transplanted to the hardware, it is required to only cache data of k pixel points to obtain the output.

The above column stretching steps are illustrated by a specific example below.

It is assumed that the resolution of an input image is 1920×1080, the resolution of column-stretched output image data is 1928×1080, then wid=1920 columns, cof_a=8, M/P=1928/1920=241/240, M=241, P=240, num1=1080 rows, and num2=1920 columns.

According to the above parameters, a column stretching filter group is obtained: F[i]=[n1, n2, n3, n4] (i=1, 2, 3, . . . , 240, wherein n3 is a center). That is, the column stretching filter group includes P=240 column stretching filter vectors in total, and each column stretching filter vector contains k=4 elements.

1) img_o=img[ . . . , c1, . . . , c2, . . . , c3, . . . , c4, . . . , c5, . . . , c6, . . . , c7, . . . , c8]

The input image is segmented into longitudinal wid/P= (wid+cof_a)/M=8 blocks and the boundary of each block is determined. Each block includes 240 elements, and there are a total of 8×240=1920 elements. The c1, c2, c3, c4, c5, c6, c7 and c8 are boundaries of the segmented 8 blocks, respectively:

c1=239, c2=479, c3=719, c4=959, c5=1199, c6=1439, c7=1679, c8=1919

2) img_wid=AddLeftRightBoundarys (input, left=2, right=1)

That is, two pixels are added to a left boundary and one pixel is added to a right boundary.

3) For each of the eight blocks, when j is smaller than P−1=239, the output pixel value is calculated by the above formula 1-2. When j is equal to P−1=239, two pixels will be obtained according to the input 239$^{th}$ pixel. The calculation of one of the two pixels is obtained according to the above formula 1-3 and the other pixel is equal to the input 239$^{th}$ pixel.

In an exemplary embodiment, the stretching parameter includes a row stretching parameter, and the generating a corresponding stretching filter group according to a stretching parameter and the selected stretching mode, and segmenting input image data into blocks includes: when the row stretching mode is selected, generating a corresponding row stretching filter group according to the row stretching parameter, the row stretching filter group including Q filters, each filter including h elements; and segmenting the input image data into horizontal high/Q blocks, wherein the high is a row number of the input image data.

In an exemplary embodiment, the Q is obtained according to a following formula: (high+Cof_b)/high=N/Q.

In the embodiment, (high+Cof_b) is a row number of data output after being row stretching processed, and N/Q is a simplest ratio.

In an exemplary embodiment, the Q is a positive integer greater than 1, and the h is smaller than the row number high of the input image data. In order to save hardware resource and save cost, the embodiments of the present disclosure propose a method that a row stretching filter vector group contains a relatively small number of elements, i.e., h is relatively small, for achieving image row stretching.

In an exemplary embodiment, the method further includes: caching the input image data of h rows.

Figure 4:
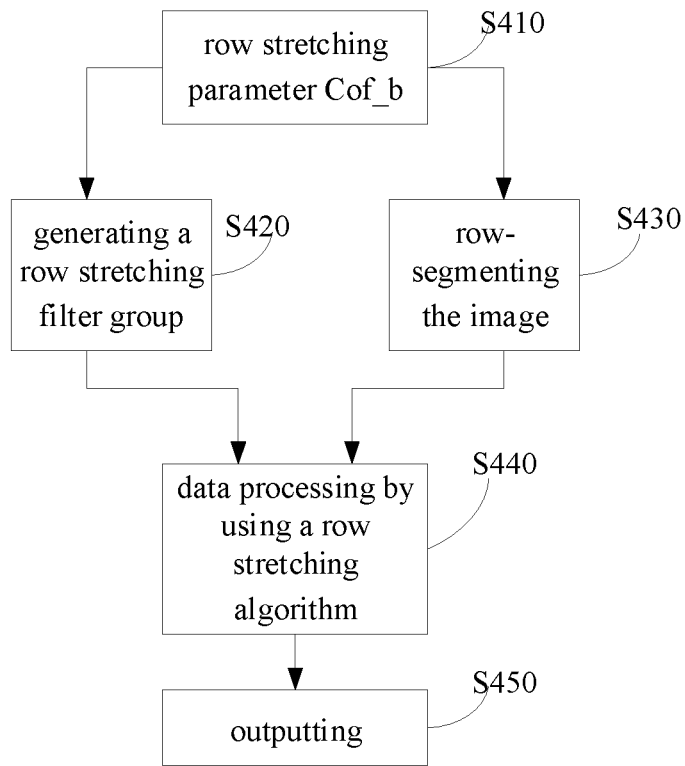
FIG. 4 shows a flowchart of row stretching mode processing in an exemplary embodiment of the present disclosure.

The data processing flow of the row stretching mode according to the embodiment of the present disclosure is shown in FIG. 4. As shown in FIG. 4, the row stretching data processing may include following steps.

In step S410, a row stretching parameter Cof_b is input.

In step S420, a row stretching filter group is generated based on the row stretching parameter Cof_b.

In step S430, the input image is row-segmented.

In step S440, the row-segmented input image is subjected to data processing by using a row stretching algorithm.

In step S450, the row-stretched image data is output.

In the embodiment of the present disclosure, in the row stretching mode, the system generates a corresponding row stretching filter group F[N] according to the row stretching parameter Cof_b. The row stretching filter group F[N] includes Q filters, each filter containing h elements, and segments the image into horizontal high/Q or (high+ cof_b)/N blocks and determines a boundary of each block. N and Q are calculated through the following 1-4:

$$(high+Cof\_b)/high=N/Q \qquad (1\text{-}4)$$

wherein high is the number of rows of the input image, Cof_b is the row stretching parameter, N/Q is the simplest ratio. Then the result is transmitted to the row stretching algorithm module for processing. When each block is processed, the pixel value output when the number of rows i is less than Q−1 is given by the formula 1-5:

$$P_{i,j}=\{\Sigma_{i-2}^{i+1}(F_m[i]\cdot f[i][j])\}/2^{10}(0<=m<=134, \\ 0<=i<=134) \qquad (1\text{-}5)$$

The pixel value output when the number of rows i is equal to Q−1 is given by the formula 1-6:

$$P_{i+1,j}=f[i][j](i=134) \qquad (1\text{-}6)$$

The $P_{i,j}$ in the above formula is the output pixel value. Fm[i] indicates that the number of filter vectors is m and the number of filter elements is i. The f [i][j] is the input image pixel. When the row stretching algorithm is transplanted to the hardware, it is only required to cache data of h rows of pixel points to obtain the output.

The above row stretching steps are illustrated by a specific example below.

It is assumed that the resolution of the input image data of the row stretching module is 1920×1080, the resolution of row-stretched output image data is 1928×1080, that is, high=1080, cof_b=8, N/Q=1088/1080=136/135, N=136 and Q=135.

According to the above parameters, a row stretching filter group is obtained: F[i]=[n1, n2, n3, n4] (i=1, 2, 3, . . . , 135). That is, the row stretching filter vector group includes Q=135 filter vectors in total, and each filter vector contains h=4 elements.

1) img_o=img[ . . . , c1, . . . , c2, . . . , c3, . . . , c4, . . . , c5, . . . , c6, . . . , c7, . . . , c8]

The input image is segmented into high/Q=1080/135=8 blocks or (high+cof_b)/N blocks and the boundary of each block is determined to be:

c1=134, c2=269, c3=404, c4=539, c5=674, c6=809, c7=944, c8=1079

2) img_wid=AddUpDownBorders(input,up=2,down=1)

Two pixels are added to an upper boundary and one pixel is added to a lower boundary.

3) For any one of the eight segmented blocks, if i is smaller than Q−1=134, the output pixel value is calculated by the above formula 1-5. When i is equal to Q−1=134, two rows of pixels will be obtained according to the 134$^{th}$ row pixel of the input image. The calculation of one row pixel is obtained according to the above formula 1-6 and the other row pixel is equal to the input row pixel.

In the embodiment of the present disclosure, the row-stretched filter vector group F[N] contains Q filters, each of which contains h elements (h is a number far less than num1). When the row stretching algorithm is transplanted to the hardware, only h rows of image data need to be cached when the stretching is performed, which can save a mass of hardware resource.

However, for example, when the stretching from 1920 rows to 1928 rows is performed by adopting an existing standard image stretching algorithm, such as a standard Bicubic algorithm, the number of filters is at least 1928. The FPGA processing data needs to be processed line by line, and data of 1920 rows needs to be cached by using a standard method. However, according to the method of the embodiment of the present disclosure, a size of each filter in the filter group is 4, and only 4 rows of data need to be cached.

In an exemplary embodiment, the processing the input image data segmented into blocks by the stretching filter group, to obtain stretched image data may include: when the row and column stretching mode is selected, performing column stretching processing on the input image data; and performing row stretching processing on the data obtained through the column stretching processing. That is, the horizontal stretching operation is performed first and then the vertical stretching operation is performed, and the vertical stretching image timing sequence is obtained by vertical stretching processing based on the horizontal stretching image timing sequence.

The row and column stretching mode in the embodiment of the present disclosure performs the column stretching processing first. The column stretching processing flow is the same as that in the embodiment shown in FIG. 3. The data after being column processed is further subjected to row stretching processing (it may save resource by performing the column stretching first and then the row stretching, so it is generally to perform column stretching first and then the row stretching). The row stretching processing flow is the same as that in the embodiment of FIG. 4. When the algorithm is transplanted to hardware, it is only required to cache data of h rows of pixel points to obtain the output.

The row stretching algorithm and column stretching algorithm disclosed in embodiments of the present disclosure respectively adopt a filter vector group F[N] and F[M] when being implemented. The column stretched filter vector F[M] contains P filters, each filter containing k elements (k is a number much less than num2). The row stretched filter vector F[N] contains N filters, each filter containing h elements (h is a number much less than num1). When the algorithm is transplanted to hardware, only k pieces of image data and h rows of image data need to be cached when the column stretching and row stretching are performed, which can save a mass of hardware resource.

Figure 5:
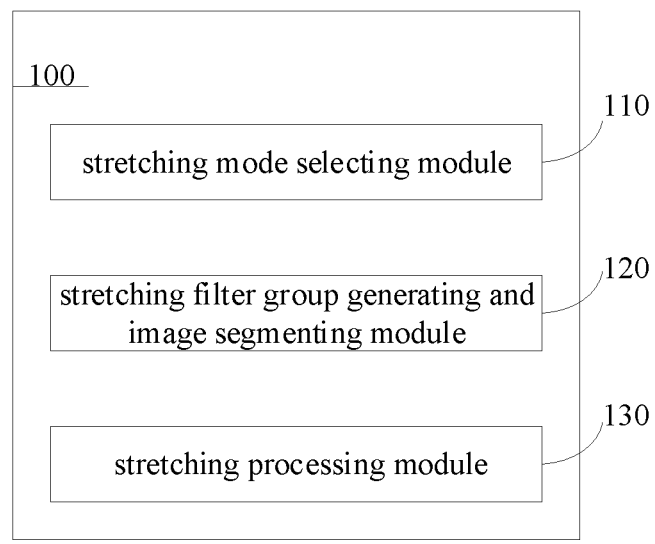
FIG. 5 shows a schematic block diagram of an apparatus for stretching an image in an exemplary embodiment of the present disclosure.

FIG. 5 shows a schematic block diagram of an apparatus for stretching an image in an exemplary embodiment of the present disclosure.

As shown in FIG. 5, the apparatus 100 for stretching an image may include a stretching mode selecting module 110, a stretching filter group generating and image segmenting module 120 and a stretching processing module 130.

The apparatus 100 for stretching an image may include a FPGA (Field-Programmable Gate Array) chip. The stretching mode selecting module 110, the stretching filter group generating and image segmenting module 120 and the stretching processing module 130 may be provided in the FPGA chip.

It should be noted that, in the present embodiment, the use of the FPGA chip is only an optional solution, and the FPGA chip may also be replaced by a Generic Array Logic (GAL), a Complex Programmable Logic Device (CPLD), or other programmable logic devices.

In the embodiment, the stretching mode selecting module 110 may be configured to select a corresponding stretching mode according to a mode selection parameter.

In an exemplary embodiment, the stretching mode may include one or more of a column stretching mode, a row stretching mode and a row and column stretching mode.

The stretching filter group generating and image segmenting module 120 may be configured to generate a corresponding stretching filter group according to a stretching parameter and the selected stretching mode, and segment input image data into blocks.

In an exemplary embodiment, the stretching filter group generating and image segmenting module may include a column stretching filter group generating and image column segmenting sub-module.

In an exemplary embodiment, the stretching filter group generating and image segmenting module may include a row stretching filter group generating and image row segmenting sub-module.

The stretching processing module 130 may be configured to process the input image data segmented into blocks by the stretching filter group, to obtain stretched image data.

In an exemplary embodiment, the stretching processing module may include a column stretching processing sub-module and a row stretching processing sub-module.

For specific implementation of the modules and/or sub-modules in the apparatus for stretching an image provided by the embodiments of the present disclosure, reference may be made to the content in the foregoing method for stretching an image, and details are not described herein again.

Figure 6:
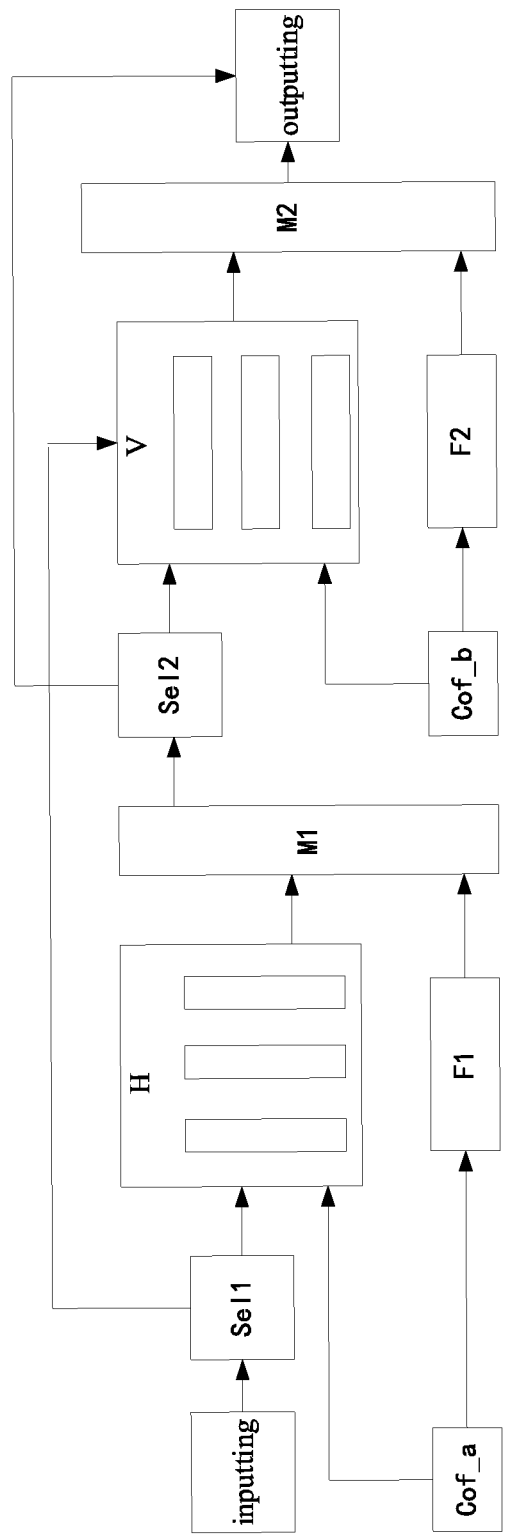
FIG. 6 shows a block diagram of a system for stretching an image in an exemplary embodiment of the present disclosure.

FIG. 6 shows a block diagram of a system for stretching an image in an exemplary embodiment of the present disclosure.

As shown in FIG. 6, an apparatus for stretching an image disclosed by embodiment of the present disclosure may include an input module, a stretching mode selecting module (Sel1), a column stretching parameter input module (Cof_a), an image column segmenting module H, a column stretching filter group generating module F1, a column stretching processing module M1, a column output selecting module (a value of Sel2 may be input, and Sel2 may also be referred to as the output selecting parameter, and to determine whether the column stretching mode is the final output), a row stretching parameter input module (Cof_b), an image row segmenting module V, a row stretching filter group generating module F2, a row stretching processing module M2 and an output module.

In the embodiment, the input module may be configured to input image data to be stretched. The stretching mode selecting module may be configured to input the value of the parameter Sel1 and select a corresponding stretching mode according to the value of Sel1. The column stretching parameter input module may be configured to input a column stretching parameter Cof_a. The image column segmenting module H may select a column stretching mode and the column stretching parameter according to the value of Sel1 to perform column segmentation on the image data input by the input module. The column stretching filter group generating module F1 may be configured to generate a corresponding column stretching filter group according to the column stretching parameter Cof_a. The column stretching processing module M1 may perform column stretching processing on the input column-segmented image data according to the column stretching filter group, thus achieving column stretching.

According to the apparatus for stretching an image provided by the embodiments of the present disclosure, column stretching, row stretching, row and column stretching of an image may be implemented. A method of stretching a filter vector group and each filter including a small number of elements is proposed, to achieve image stretching. The corresponding column and row filter vector groups are generated according to the column and row stretching parameters, and the stretching method implemented by the vector group can save a large amount of hardware resource when being transplanted to hardware.

The various modules of the present disclosure may be implemented by a computer device and a correspondingly configured software algorithm. Specifically, the apparatus for stretching an image of the present embodiment may include: a processor; and a memory, having computer readable codes stored thereon that, when executed, causes the processor to perform the method for stretching an image according to the above aspect of the present disclosure.

In the method for stretching an image in some embodiments of the present disclosure, a stretching filter group is generated by the stretching parameter and the selected stretching mode, and the stretching of the input image data is achieved according to the stretching filter group. It may save significant hardware resource when the algorithm is transplanted on hardware.

Other embodiments of the present disclosure will readily occur to those skilled in the art upon consideration of the specification and practice of the disclosure disclosed herein. The present application is intended to cover any variations, uses, or adaptations of the present disclosure that follow general principles of the present disclosure and include common knowledge or conventional technical means in the art which are not disclosed herein. The specification and embodiments are considered as exemplary only, with the true scope and spirit of the present disclosure being indicated by the appending claims.

What is claimed is:

1. A method for stretching an image, comprising:
   selecting a corresponding stretching mode according to a mode selection parameter;
   generating a corresponding stretching filter group according to a stretching parameter and the selected stretching mode, and segmenting input image data into blocks; and
   processing the input image data segmented into blocks by the stretching filter group, to obtain stretched image data,
   wherein the mode selection parameter comprises a first parameter and a second parameter, and the step of selecting a corresponding stretching mode according to a mode selection parameter comprises:
   selecting a column stretching mode when the first parameter is a first value and the second parameter is a second value;
   selecting a row stretching mode when the first parameter is the second value and the second parameter is the first value; and
   selecting a row and column stretching mode when both the first parameter and the second parameter are the first values.

2. The method for stretching an image according to claim 1, wherein the stretching parameter comprises a column stretching parameter, the step of generating a corresponding stretching filter group according to a stretching parameter and the selected stretching mode, and segmenting input image data into blocks comprises:
   when the column stretching mode is selected, generating a corresponding column stretching filter group according to the column stretching parameter, the column stretching filter group comprising P filters, each filter comprising k elements; and
   segmenting the input image data into longitudinal wid/P blocks, wherein the wid is a column number of the input image data.

3. The method for stretching an image according to claim 2, wherein the P is obtained according to a following formula:

$$(\text{wid}+\text{Cof\_a})/\text{wid}=M/P$$

wherein wid is a number of columns of input image, Cof_a is a column stretching parameter, (wid+Cof_a) is a column number of data output after being column stretching processed, and M/P is a simplest ratio resulted from (wid+Cof_a)/wid.

4. The method for stretching an image according to claim 2, wherein the P is a positive integer greater than 1, and the k is smaller than the column number wid of the input image data.

5. The method for stretching an image according to claim 2 further comprises: caching the k input image data.

6. The method for stretching an image according to claim wherein the stretching parameter comprises a row stretching parameter, and the step of generating a corresponding stretching filter group according to a stretching parameter and the selected stretching mode, and segmenting input image data into blocks comprises:
   when the row stretching mode is selected, generating a corresponding row stretching filter group according to the row stretching parameter, the row stretching filter group comprising Q filters, each filter comprising h elements; and
   segmenting the input image data into horizontal high/Q blocks, wherein the high is a row number of the input image data.

7. The method for stretching an image according to claim 6, wherein the Q is obtained according to a following formula:

$$(\text{high}+\text{Cof\_b})/\text{high}=N/Q \quad (1\text{-}4)$$

wherein high is a number of rows of input image, Cof_b is a row stretching parameter, (high+Cof_b) is a row number of data output after being row stretching processed, and N/Q is a simplest ratio resulted from (high+Cof_b)/high.

8. The method for stretching an image according to claim 6, wherein the Q is a positive integer greater than 1, and the h is smaller than the row number high of the input image data.

9. The method for stretching an image according to claim 6 further comprises: caching the input image data of h rows.

10. The method for stretching an image according to claim, wherein the step of processing the input image data segmented into blocks by the stretching filter group, to obtain stretched image data comprises:
    when the row and column stretching mode is selected, performing column stretching processing on the input image data; and performing row stretching processing on the data obtained through the column stretching processing.

11. The method for stretching an image according to claim 1, wherein a resolution of the input image data is wid multiplied by high, a resolution of the stretched image data is (wid+Cof_a) multiplied by (high+Cof_b), wherein Cof_a is less than wid and Cof_b is less than high, wherein wid is a number of columns of input image, Cof_a is a column stretching parameter, high is a number of rows of input image, Cof_b is a row stretching parameter.

12. An apparatus for stretching an image, comprising:
a processor; and
a memory, having computer readable codes stored thereon that, when executed, causes the processor to perform:
selecting a corresponding stretching mode according to a mode selection parameter;
generating a corresponding stretching filter group according to a stretching parameter and the selected stretching mode, and segmenting input image data into blocks; and
processing the input image data segmented into blocks by the stretching filter group, to obtain stretched image data,
wherein the mode selection parameter comprises a first parameter and a second parameter, and the step of selecting a corresponding stretching mode according to a mode selection parameter comprises:
selecting a column stretching mode when the first parameter is a first value and the second parameter is a second value;
selecting a row stretching mode when the first parameter is the second value and the second parameter is the first value; and
selecting a row and column stretching mode when both the first parameter and the second parameter are the first values.

13. The apparatus for stretching an image according to claim 12, wherein the stretching parameter comprises a column stretching parameter, the generating a corresponding stretching filter group according to a stretching parameter and the selected stretching mode, and segmenting input image data into blocks comprises:
when the column stretching mode is selected, generating a corresponding column stretching filter group according to the column stretching parameter, the column stretching filter group comprising P filters, each filter comprising k elements; and
segmenting the input image data into longitudinal wid/P blocks, wherein the wid is a column number of the input image data.

14. The apparatus for stretching an image according to claim 13, wherein the P is obtained according to a following formula:

$$(\text{wid}+\text{Cof}\_a)/\text{wid}=M/P$$

wherein wid is a number of columns of input image, Cof_a is a column stretching parameter, (wid+Cof_a) is a column number of data output after being column stretching processed, and M/P is a simplest ratio resulted from (wid+Cof_a)/wid.

15. The apparatus for stretching an image according to claim 12, wherein the stretching parameter comprises a row stretching parameter, and the generating a corresponding stretching filter group according to a stretching parameter and the selected stretching mode, and segmenting input image data into blocks comprises:
when the row stretching mode is selected, generating a corresponding row stretching filter group according to the row stretching parameter, the row stretching filter group comprising Q filters, each filter comprising h elements; and
segmenting the input image data into horizontal high/Q blocks, wherein high is a row number of the input image data.

16. The apparatus for stretching an image according to claim 15, wherein the Q is obtained according to a following formula:

$$(\text{high}+\text{Cof}\_b)/\text{high}=N/Q \qquad (1\text{-}4)$$

wherein high is a number of rows of input image, Cof_b is a row stretching parameter, (high+Cof_b) is a row number of data output after being row stretching processed, and N/Q is a simplest ratio resulted from (high+Cof_b)/high.

17. The apparatus for stretching an image according to claim 12, wherein the processing the input image data segmented into blocks by the stretching filter group, to obtain stretched image data comprises:
when the row and column stretching mode is selected, performing column stretching processing on the input image data; and
performing row stretching processing on the data obtained through the column stretching processing.

18. The apparatus for stretching an image according to claim 12, wherein a resolution of the input image data is wid multiplied by high, a resolution of the stretched image data is (wid+Cof_a) multiplied by (high+Cof_b), wherein Cof_a is less than wid and Cof_b is less than high, wherein wid is a number of columns of input image, Cof_a is a column stretching parameter, high is a number of rows of input image, Cof_b is a row stretching parameter.

* * * * *